United States Patent Office 2,732,311
Patented Jan. 24, 1956

2,732,311

COATING PROCESS OF PRODUCING RADIATION-REFLECTIVE ROOFING GRANULES

George Hartwright, Chicago, Ill., assignor to United States Gypsum Company, Chicago, Ill., a corporation of Illinois No Drawing. Application January 15, 1952,
Serial No. 266,591

7 Claims. (Cl. 117—27)

The present invention relates to radiation-reflective roofing granules and to a process for their manufacture.

In the manufacture of roofing material it has long been the practice to embed roofing granules into the bituminous coating of such material. These granules have consisted either of slate, various types of stone, ceramic material, either uniformly colored throughout or surface colored, as by the affixation of colored mineral matter, pigments, paint, or similar coating substances.

All of these types of granules are heat-absorbing, and as the underlying bituminous coating is also black and will hence readily absorb heat, roofing materials and shingles thus made cause the space beneath a roof or wall thus covered to be warmer than may be desirable.

Inasmuch as it is well known that bright, shiny metallic surfaces are radiation-reflecting, attempts have been made to apply shiny tile and metal coverings to roofs and the walls of buildings. These have, however, usually been in the form of continuous sheets or the like, which are monotonous and bleak in appearance.

It is one of the objects of this present invention to provide roofing granules which are individually covered with an adherent covering of shiny, radiation-reflecting thin metallic flakes, such as aluminum flakes, copper flakes, brass flakes, or metallic particles of the general type known as "bronze powders," which includes what is also known as "aluminum bronze."

It is a further object of the present invention to provide a process whereby inorganic roofing granules may be coated with such shiny metallic flakes without substantially impairing their radiation-reflecting properties.

A still further object is to provide roofing material, such as roll roofing and cut shingles which are surfaced with granules having thin radiation-reflecting flaky particles adhering thereto.

Another object is to provide aluminum-coated roofing granules having a high resistance to disintegration by water.

Other objects will readily occur to those skilled in the art in which this invention is a part.

In practicing this invention crushed rock granules, usually of a size which will pass through a No. 10 mesh screen and be retained on a 35 mesh, are employed as a base. These granules may be of such material as fine grain silica bonded quartzite containing sufficient impurities to make the rock relatively opaque to light, including ultra violet light, such for instance, as gray or smoky quartzite. Trap rock, or other igneous rocks which are relatively inert and which can withstand heating up to about 1000° F. without decomposition or cracking, may also be used, as may artificially prepared materials such as crushed brick, porcelain, terra cotta, or other ceramic wastes, as well as slags, or even slate.

The uncoated granules and a clay-like material, such as kaolin, are thoroughly mixed in a suitable mixer and at a temperature below 100° F., preferably at room temperature, for a period of five to ten minutes, whereafter a solution of sodium silicate, preferably that known as "N brand" (as made by the Philadelphia Quartz Co.) having a ratio of $Na_2O$ to $SiO_2$ of about 1 to 3.22, and a specific gravity of about 1.395, is added in a slow stream to the thoroughly mixed crushed rock and clay while the mixer is in operation. Usually three to five minutes are required for this, depending on the equipment. The rock and clay are preferably used dry, but the presence of a reasonable amount of moisture is permissible.

It is within the scope of this invention to use sodium silicate having other $Na_2O$ to $SiO_2$ ratios besides the above, for example even those having a high alkalinity such as that commonly known as "D" brand (made by the Philadelphia Quartz Co.) with a ratio of 1 to 2, and having 43.5% solids and a specific gravity of 1.51. This is not as satisfactory for the purpose, as its higher alkalinity increases the likelihood of a reaction with the aluminum powder or other pigment, dulling its luster or even destroying it completely. Thus while the ratios of $Na_2O$ to $SiO_2$ may vary from that corresponding to 1 to 2 to 1 to 3.22, the latter or lower alkali ratio is much more desirable, as it is less reactive and hence more easily controlled.

It is to be understood that the specific gravity or percentage of solids in the sodium silicate solution may be varied within a wide limit, such as 37.9% or lower and 43.5% or higher. While it is not recommended, additional water may also be added, but must be removed in a subsequent drying action. It is preferred to use a fairly thick or viscous composition in order to be assured that enough of the sodium silicate will be retained upon the granules. Too thick a mixture will supply more binder than is required, while if it be too thin it will not be sufficient for proper bonding. Usually about a fifteen minute period, depending upon the equipment, is required for the addition of the sodium silicate and its thorough mixing with clay-coated granules. There must be a complete mixing of clay and sodium silicate on the granule surface.

It is also within the scope of the present invention to pre-mix the clay and the sodium silicate before applying it to the granules, but the previously described procedure is preferable. The next step is to develop a tacky viscous film upon the surface of the granules. This is accomplished by passing a fairly gentle stream of clean cool air over the wet coated granules while the mixer is in action, which partially dries the surface and forms the above required tacky film. This air drying process usually requires several minutes, say two minutes or more, depending on the equipment, to develop the proper tacky silicate film. The temperature of the air should be low, such as between 60° to 90° F., though higher temperature may be used, provided that a proper film is formed, and that the temperature is not high enough to cause excessive reaction between the sodium silicate and the aluminum powder when it is subsequently added. Too hot a blast will cause the silicate coating to lose water too rapidly, thus developing too dry a surface on the coating, or too viscous a film, and in turn may cause caking of the individual coated rock particles at this stage. Excessive air drying of the silicate-clay binder will cause surface to become too dry and thereby eliminate the tacky film stage. This over dry stage of the coating will prevent proper adherence of the aluminum powder to the coating. In addition, the partial air drying of the clay-silicate coating is of a short time duration, so a hot blast of air makes control of the proper tacky film more difficult.

When the proper viscous tacky film has been formed, the aluminum flakes, preferably as coarse as No. 322 (made by the Aluminum Company of America), or even coarser, are then added to the above mixture and are caused to adhere to the coated granules by further mixing. A finer grade of flakes may be used but will not be as satisfactory from the standpoint of color. Before the aluminum flakes are added it is important that the proper tacky stage is developed by the silicate-clay binder in order to develop a good leafing action of the aluminum flakes on the coating. The ability to leaf out, adhere and cover the coated granule surface is very important, especially from the standpoint of developing brilliant metallic color. Thus the aluminum flakes are adhered to only one of the flake surfaces, which is characteristic of a leafing action. The other surface is left exposed with little or no coating, resulting in a high metallic lustre. The leafing action cannot be adequately obtained if the aluminum flakes wet down into the coating mass on the granule surface due to an improperly prepared silicate film. This would cause the silicate type of adhesive to flow over onto the exposed surface of the flakes. Also, if the proper tack is not imparted to the film (i. e. the binder is too fluid) there is a greater tendency for reaction with the aluminum to take place.

Immediately after the addition of the aluminum flakes, or other flaky, shiny pigment, for best results time becomes an important factor. The addition and mixing of the aluminum flakes should not exceed about five minutes and immediately thereafter the wet granules should be started on the firing cycle. Longer agitation or mixing will excessively wet the surfaces of the aluminum flakes, and also tends to destroy the leafy position effect and consequently impairs the brilliant metallic color. Excessive or additional agitation, excessive heating, or lapse of time beyond a few minutes between the mixer and the calciner should also be avoided as much as possible, as this causes additional disturbance of the leafy position effect of the aluminum flakes. There is no danger of a reaction between the flakes and the silicate at this point if the temperature and the mixing is controlled as outlined above. The control of temperature while the coating is still wet is the most important factor in preventing a reaction.

The firing may be carried out in a manner well known in the art, such as by the use of a rotary calciner. The firing cycle usually requires about twenty minutes to go from room temperature to between 900° to 1000° F. The important point is that the coating should reach maximum temperature in this range, but need not be held at the maximum temperature for any length of time. The maximum temperature should not be reached too fast because of the danger of injuring and removing the coating from the base granules. Lower temperatures, even as low as 500° F., may be used, but with increasing sacrifice in weather resistance of the coatings. Temperatures in excess of 1000° F., may be used, but there is a danger that the metallic lustre of the aluminum will be affected. Obviously temperatures around or in excess of the melting point of aluminum, i. e., 1218° F., should be avoided. A temperature range of 900° to 1000° F. is much to be preferred. The firing should be carried out very carefully until all the free moisture has been removed from the coating. The coating may be fired thereafter at a much higher rate until peak temperature is reached.

It will be evident, particularly in a batch operation, that the temperature will remain in the proximity of the boiling point of water until most of the moisture has been removed, whereafter it will rapidly rise, reaching the maximum in about twenty minutes. In case of a continuous calciner, the maximum temperature will be attained during the later stages of travel of the coated granules. In all events, undue overheating should be avoided.

After the granules have been heated they are cooled to between 250° to 350° F. and oiled, as is common practice in the manufacture of roofing granules.

The following illustrates the preferred proportions and materials to be used in carrying out this invention:

|  | Range | | Preferred, pounds |
|---|---|---|---|
|  | Min., pounds | Max., pounds |  |
| Crushed rock granules | 2,000 | 2,000 | 2,000 |
| Clay—Kaolinic type such as Peerless Clay (R. T. Vanderbilt Co.) | 15 | 80 | 30 |
| Sodium silicate "N" brand preferred 1:3.22 $Na_2O$ to $SiO_2$ ratio, 1.39 sp. gr. | 15 | 200 | 72 |
| Aluminum powder, No. 322 (Aluminum Co. of America) | 5 | 50 | 15 |

The proportions of the various ingredients are not critical, however, though the preferred formulation shown above has been found among the most satisfactory, particularly a clay to sodium silicate ratio of 1:2.4.

It is to be understood that a number of different clays may be used to carry out this invention other than the Peerless clay made by R. T. Vanderbilt Co., referred to in the above example. Other types of kaolinic clays are suitable. Other non-kaolinic types of clays may be used with varying results.

Potassium silicate may be substituted for sodium silicate but the additional cost, in general, is not justified by any advantage which may accrue. If such is done a change in the above procedure and formulation is necessary, using equivalent amounts of the potassium silicate.

Aluminum coated granules prepared in accordance with this invention will be found to have a high lustre and to be very resistant to weathering. This has heretofore not been obtained in the prior art. Granules prepared following this invention were used in preparing experimental panels in which they were embedded into an asphalt matrix comparable to that used in preparing a strip shingle. These were subjected to exposure for about four years near Los Angeles, California; Madison, Wisconsin; and Miami, Florida, and no fading or adhesive failures were observed. The appearance was still very good after the about-four-year period. Thus an improved and highly useful granule has been obtained.

The effectiveness of the aluminum coating upon the granules is ascribable mainly to the well known property of bright shiny aluminum of reflecting not only radiation within the wave-length of visible light, but particularly that in the wave length of heat waves, so that the heat of sunlight will be largely reflected. This not only keeps the granules cooler, but also minimizes softening of the asphalt coating in which they are partially embedded.

Furthermore, roofing material made from such aluminum-coated granules is very attractive in appearance. When properly made, aluminum coated roofing granules of the present invention are highly resistant to disintegration by water. When subjected to a boiling water leach test (test 2.04 listed in "Analyses and Testing of Roofing Surfacing Materials and Composition Roofing" 2d edition, R. J. Funkhouser and Co.) the granules will be found to be substantially unaffected after eighteen hours. This has not hitherto been attainable by prior art methods.

As already briefly indicated, other metallic flake-like particles, such as the "bronze powders" of commerce, may be substituted for aluminum. Thus copper flakes will give a granule which at first has a coppery appearance, which soon mellows down to the typical copper patina, which is a soft bluish green, whereafter the granules will continue to keep that appearance, thus giving the general effect of the copper roofs so widely used abroad. The same is true of copper alloy flakes, such as bronze (copper-tin alloy) or brass (copper-zinc alloy).

These bronze powders, including the aluminum "powder," are not really powders at all, but are extremely small and thin flake-like particles, which have a decided tendency to overlie one another like the scales on a fish. This is termed in this industry as the power to "leaf," and gives bronze powder lacquers their special appearance.

When using other metals than aluminum, the procedure is not materially changed, except that, of course, the firing temperature must be below the fusing point of the particular metal or alloy employed. When copper alloy, bronze powders are used, it may be advisable to use neutral or reducing atmosphere during the high temperature firing to obtain good metallic colors with avoidance of oxidation.

The outstanding characteristics of the granules made in accordance with the present invention are their durability and long-lasting bright appearance and light and heat reflective properties.

The apparatus employed in carrying out the present invention is simple and so very well known as not to require any illustration.

Accordingly, I claim:

1. Process of producing roofing granules covered with thin radiation-reflecting metallic flakes which comprises coating mineral granules with a mixture of clay and an alkali silicate having an alkali-oxide to silica ratio at least as high as 1:2, partially drying the coating thus produced to render it tacky, then covering the coating with minute radiation-reflecting metallic flakes, and heating the thus covered granules to a temperature within the range of from about 500° F. to just below the melting point of the metallic flakes, whereby to bond them to the granules.

2. Process of producing roofing granules covered with thin radiation-reflecting aluminum flakes which comprises coating mineral granules with a mixture of clay and an alkali silicate having an alkali-oxide to silica ratio at least as high as 1:2, partially drying the coating thus produced to render it tacky, then covering the coating with shiny aluminum flakes, and heating the thus covered granules to a temperature within the range of from about 500° F. to just below the melting point of the aluminum flakes, whereby to bond them to the granules.

3. Process of producing roofing granules covered with thin radiation-reflecting copper flakes which comprises coating mineral granules with a mixture of clay and an alkali silicate having an alkali-oxide to silica ratio at least as high as 1:2, partially drying the coating thus produced to render it tacky, then covering the coating with copper flakes, and heating the thus covered granules to a temperature within the range of from about 500° F. to just below the melting point of the copper flakes, whereby to bond them to the granules.

4. Process of producing roofing granules covered with thin radiation-reflecting bronze flakes which comprises coating mineral granules with a mixture of clay and an alkali silicate having an alkali-oxide to silica ratio at least as high as 1:2, partially drying the coating thus produced to render it tacky, then covering the coating with bronze flakes, and heating the thus covered granules to a temperature within the range of from about 500° F. to just below the melting point of the bronze flakes, whereby to bond them to the granules.

5. Process of producing roofing granules covered with thin radiation-reflecting bronze powder which comprises coating mineral granules with a mixture of clay and an alkali silicate having an alkali-oxide to silica ratio at least as high as 1:2, partially drying the coating thus produced to render it tacky, then covering the coating with bronze powder, and heating the thus covered granules to a temperature within the range of from about 500° F. to just below the melting point of the bronze powder, whereby to bond them to the granules.

6. Process of producing roofing granules covered with thin radiation-reflecting aluminum flakes which comprises coating mineral granules with a mixture of clay and an alkali silicate having an alkali-oxide to silica ratio at least as high as 1:2, partially drying the coating thus produced to render it tacky, then covering the coating with aluminum bronze flakes, and heating the thus covered granules to a temperature within the range of from about 500° F. to just below the melting point of the aluminum bronze flakes, whereby to bond them to the granules.

7. In a process of coating mineral granules with a coating of aluminum bronze powder to produce highly light-reflective granules and in which an alkali silicate is used as the bonding agent for adhering said powder to the mineral granules, the improvement which comprises applying a mixture of clay and a sodium silicate solution to said granules, drying said mixture on the granules until it is tacky, then applying aluminum bronze powder to the coated granules and thereafter heating them to a temperature within the range of from about 500° F. to just below the melting point of said bronze powder whereby to bond it to the granules.

References Cited in the file of this patent

UNITED STATES PATENTS

| | | |
|---|---|---|
| 1,574,615 | Fleming | Feb. 23, 1926 |
| 1,789,443 | Levin | Jan. 20, 1931 |
| 1,915,201 | Ragg | June 20, 1933 |
| 1,920,931 | Finley | Aug. 1, 1933 |
| 1,922,221 | Steenbeck et al. | Aug. 15, 1933 |
| 2,332,220 | Harshberger | Oct. 19, 1943 |
| 2,374,331 | Cooke | Apr. 24, 1945 |
| 2,422,927 | Reynolds | June 24, 1947 |

OTHER REFERENCES

P. O. Bulletin, No. 241, Silicate of Soda Cements, 1940.